United States Patent [19]

Millar

[11] 3,748,623
[45] July 24, 1973

[54] PRESSURE TRANSDUCERS
[75] Inventor: Huntly Drummond Millar, Houston, Tex.
[73] Assignee: Millar Instruments, Inc., Houston, Tex.
[22] Filed: July 25, 1972
[21] Appl. No.: 274,874

Related U.S. Application Data
[63] Continuation-in-part of Ser. No. 158,884, July 1, 1971, abandoned.

[52] U.S. Cl. .................... 338/4, 73/88.5 SD, 338/3, 338/5, 338/42
[51] Int. Cl. ............................................. G01l 1/22
[58] Field of Search ................... 338/4, 2, 3, 5, 42; 73/88.5 SD, 88.5 R, 398 AR

[56] References Cited
UNITED STATES PATENTS 3,088,323  5/1963  Welkowitz et al. ............ 73/398 AR
3,480,003  11/1969  Crites ........................... 73/88.5 R X
3,553,625  12/1967  Stedman ............................... 338/4

Primary Examiner—C. L. Albritton
Attorney—Paul Vanslyke et al.

[57] ABSTRACT

A novel miniature blood pressure transducer is described including a catheter tip transducer implantable in an artery or vein. The transducer employs a novel strain gauge for converting blood pressure pulsations into measurable electrical signals. The strain gauge is formed of two strain sensitive elements composed of a piezoresistive material. The strain occurring in each element is concentrated in separate reduced neck portions. The reduced neck portions are substantially parallel to each other and are of substantially the same dimension. Force supplied to the strain gauge results in placing one reduced neck portion in tension while placing the other reduced neck portion in compression.

4 Claims, 13 Drawing Figures

Patented July 24, 1973  3,748,623
3 Sheets-Sheet 1
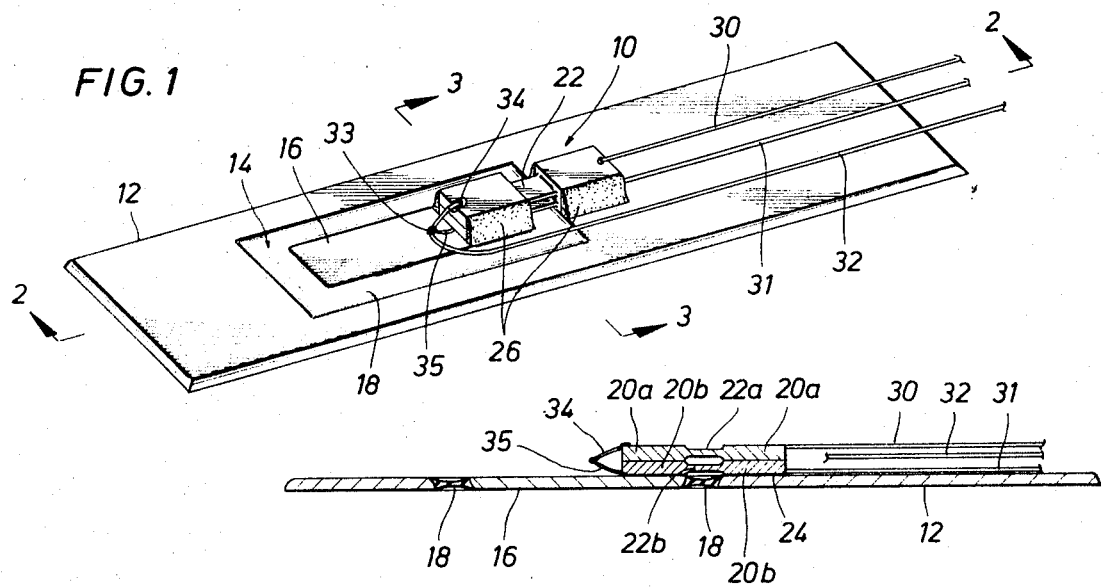
FIG. 1
FIG. 2
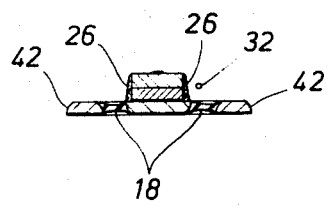
FIG. 3
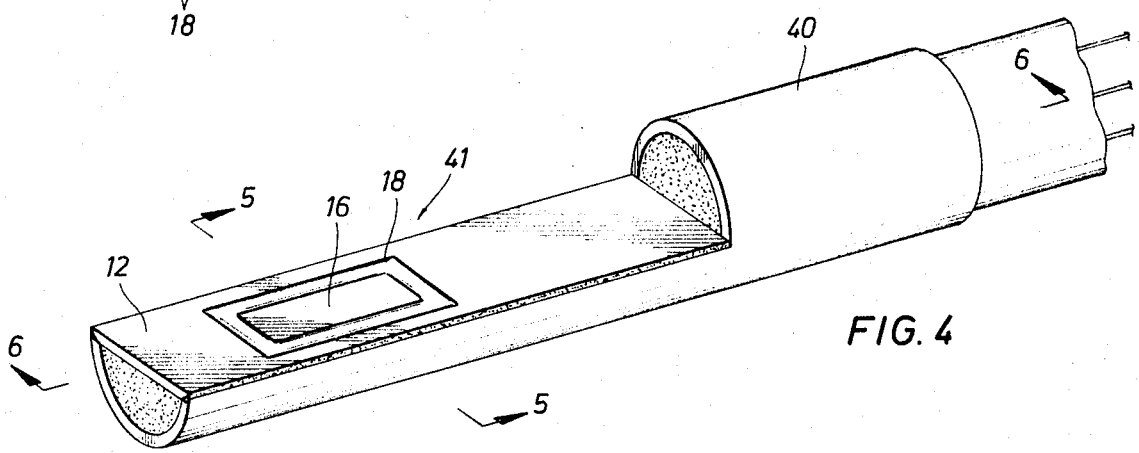
FIG. 4
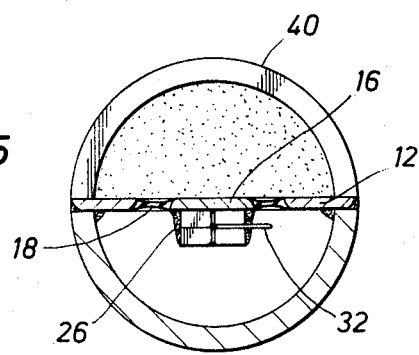
FIG. 5
Huntly D. Millar
INVENTOR
BY
Arnold, White & Durkee
ATTORNEYS Patented July 24, 1973    3,748,623
3 Sheets-Sheet 2
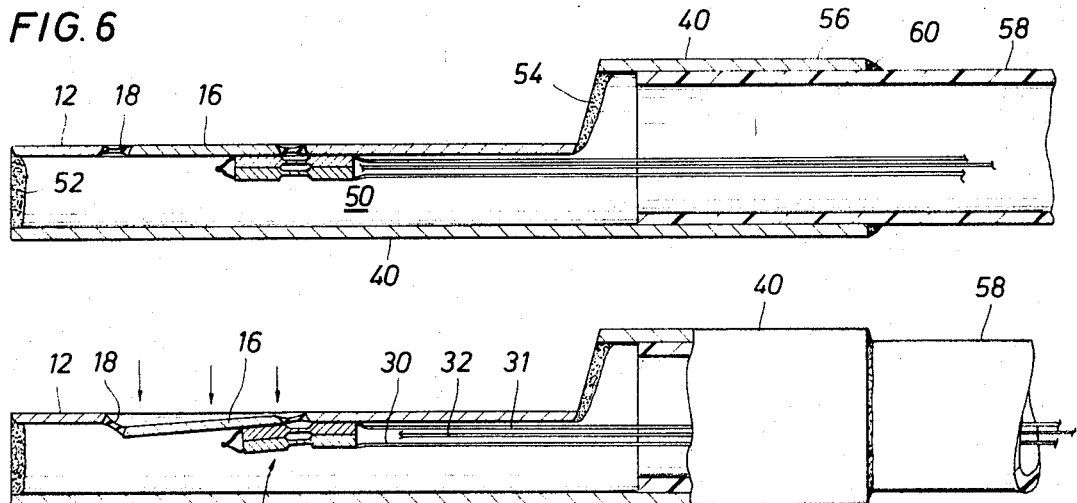
FIG. 6
FIG. 7
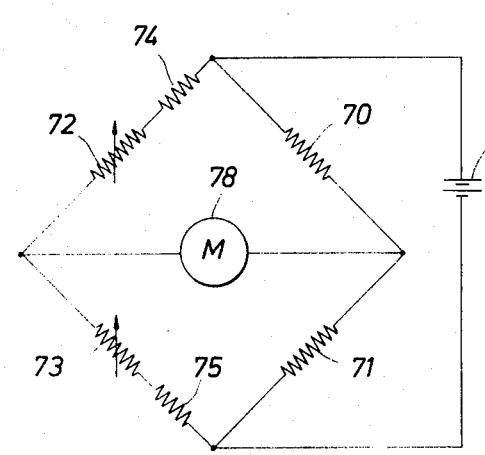
FIG. 8
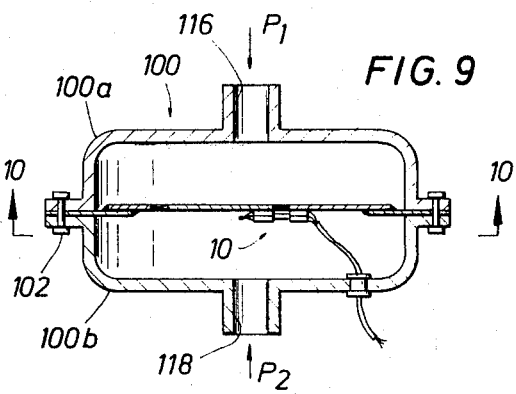
FIG. 9
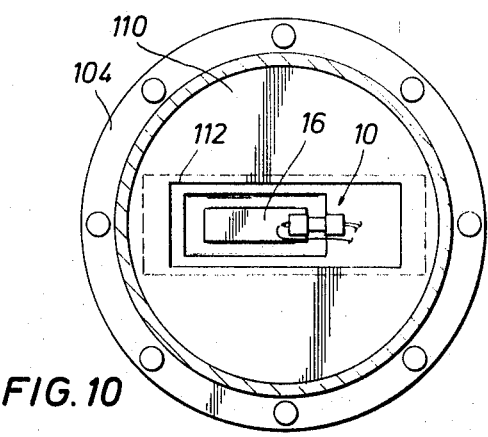
FIG. 10
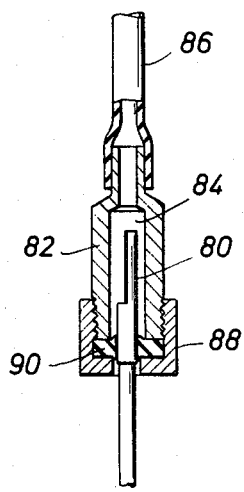
FIG. 11
Huntly D. Millar
INVENTOR
BY
Arnold, White & Durkee
ATTORNEYS Patented July 24, 1973

Huntly D. Millar
INVENTOR

BY

Arnold, White & Durkee
ATTORNEYS

PRESSURE TRANSDUCERS

CROSS REFERENCE TO RELATED APPLICATIONS

This application is a continuation-in-part of copending application Ser. No. 158,884, filed July 1, 1971, now abandoned.

BACKGROUND OF THE INVENTION

This invention relates to pressure transducers and in particular to miniature transducers for making physiological measurements such as blood pressure measurement.

The present invention has particular application to the measurement of blood pressure in humans and animals, and the invention will be described with reference to that field. It should be understood, however, that the invention has other applications in physiological pressure measurement.

Miniature blood pressure transducers are employed widely in modern medicine during cardiovascular surgery and monitoring of the blood pressure of human patients and animals. As illustrated by U. S. Pat. Nos. 3,088,323 to Welkowitz and 2,553,625 to Stedman, such transducers can be housed in a catheter tip or probe for intraarterial and intravenous blood pressure measurements and generation of blood pressure recordings. The pressure transducer and catheter tip can be constructed so small that it can be inserted into an artery through the skin of a human or animal and pressed through the artery directly into the heart.

Various attempts have been made to improve the sensitivity and reliability of miniature blood pressure transducers. For example, ultra sensitive strain gauges of both wire and semiconductor type have been employed to sense the flexure of a diaphragm which is deflected by blood pressure pulsations. A novel use of strain gauge sensors in blood pressure measurement is described in co-pending application for U. S. Letters Patent, Ser. No. 114,610 filed Feb. 11, 1971.

Recent advances in strain gauges have been described for purposes other than blood pressure measurement in such instances as U. S. Pat. Nos. 3,351,880 and 3,501,732, both to Wilner and U. S. Pat. No. 3,492,513 to Hollander.

It has been standard in blood pressure transducers to secure a strain gauge to another element such as a beam in order to provide a mounting base. A force acting on the beam causes deformation in the form of compression or tension of the strain gauge element. The supporting beam has been thought to be necessary, primarily to obtain the mechanical rigidity necessary in most applications. Much of the energy of the measuring force is used to bend the supporting beam, thus reducing the effective sensitivity.

Miniature strain gauges for measuring small forces are subject to difficulties in use associated with differences in thermal coefficient of expansion. When there is a difference in the coefficient of expansion of the material of the strain gauge and the material to which the strain gauge is attached, strains are generated internally in the strain gauge from sources not related to the force to be measured.

SUMMARY OF THE INVENTION

The present invention provides a blood pressure transducer which has improved sensitivity and reliability beyond anything known in the state of the art. The small size of the transducer constructed in accordance with the invention readily lends itself to miniature application. For example, the invention may be embodied in a miniature blood pressure transducer of the catheter type for intraarterial and intravenous blood pressure measurements. Furthermore, the invention can be embodied in blood pressure transducers that are directly implantable in a human or animal heart.

In accordance with one embodiment of the invention, a blood pressure transducer is provided of the catheter type. The transducer is composed of a catheter tip having a flattened side. A diaphragm is mounted in the flattened side of the catheter tip. Within a sealed compartment inside the catheter tip, a strain gauge element of the type described below is mounted in a position to measure the flexure of the diaphragm in response to blood pressure variations. The catheter tip is connected to a flexible hose which contains the electrical conductors for connection to the strain gauge element as well as provides a passageway from the sealed compartment to a source of reference pressure, such as the atmosphere.

The strain gauge embodied in the blood pressure transducer according to the invention is of novel type. This gauge employs the principle of concentration of strain in a sensitive portion of the strain gauge, but in a manner employing dual strain-sensitive elements in a push-pull, mechanical configuration. One end of the gauge may be anchored while the other end may be actuated directly by a force to be measured. The energy in the measuring force can be applied directly to actuation of the transducer gauge. No energy need be expended in bending a beam to which the strain gauge is attached. The bulk of material subjected to stress is part of the signal generating material. Lateral forces are converted directly to longitudinal strain.

In accordance with one embodiment the strain gauge is formed of two elements of a piezoresistive material which are bonded together. The two elements form a unitary structure which can be completely self supporting and mechanically rigid. Each element has a portion of reduced thickness along an axis perpendicular to the direction of application of force.

In a presently preferred embodiment, each element of the strain gauge is comprised of two end pads that are interconnected by a reduced neck portion. The two elements are bonded together at their end pads but are maintained electrically insulated from each other. The end pads have faces which are contiguous with each other, but the reduced neck portions of each element are spaced from each other.

This novel type of strain gauge avoids most of the problems associated with differences in coefficient of expansion. The strain gauge has two elements of the same coefficient of expansion to provide the support for each other and temperature compensation. Strains due to differences in coefficient of expansion with the surface to which the transducer is mounted are negligible.

BRIEF DESCRIPTION OF THE DRAWINGS

Details of specific embodiments of the invention are described with reference to the accompanying drawings in which:

FIG. 1 is a perspective view of the strain gauge portion of a pressure transducer constructed in accordance with one embodiment of the present invention.

FIG. 2 is a sectional view taken along line 2—2 in FIG. 1.

FIG. 3 is a sectional view taken along line 3—3 in FIG. 1.

FIG. 4 is a perspective view of a catheter tip blood pressure transducer constructed in accordance with one embodiment of the present invention.

FIG. 5 is a sectional view taken along lines 5—5 in FIG. 4.

FIG. 6 is a sectional view taken along line 6—6 in FIG. 4.

FIG. 7 is another sectional view taken along line 6—6 in FIG. 4 with the diaphragm under flexure.

FIG. 8 is a wiring diagram of the pressure transducer of the present invention connected in a bridge circuit.

FIG. 9 is a sectional view of a differential pressure transducer embodying the present invention.

FIG. 10 is a sectional view taken along line 10—10 in FIG. 9.

FIG. 11 is a pressure dome, partly in section for measurement of blood pressure external to the body using the catheter tip blood pressure transducer illustrated in FIG. 4.

Referring to FIGS. 1–3, there is shown the novel strain-sensitive transducer 10 which is secured to a plate member 12. A diaphragm 14 is provided in an opening form in the plate member 12. The diaphragm is comprised of a central rigid plate or piston 16 which is supported by an elastic material 18, such as silicone rubber, joined to the edges of the slot formed in the plate member 12. The piston 16 is free to move in response to incident fluid pressure variations.

Figure 12:
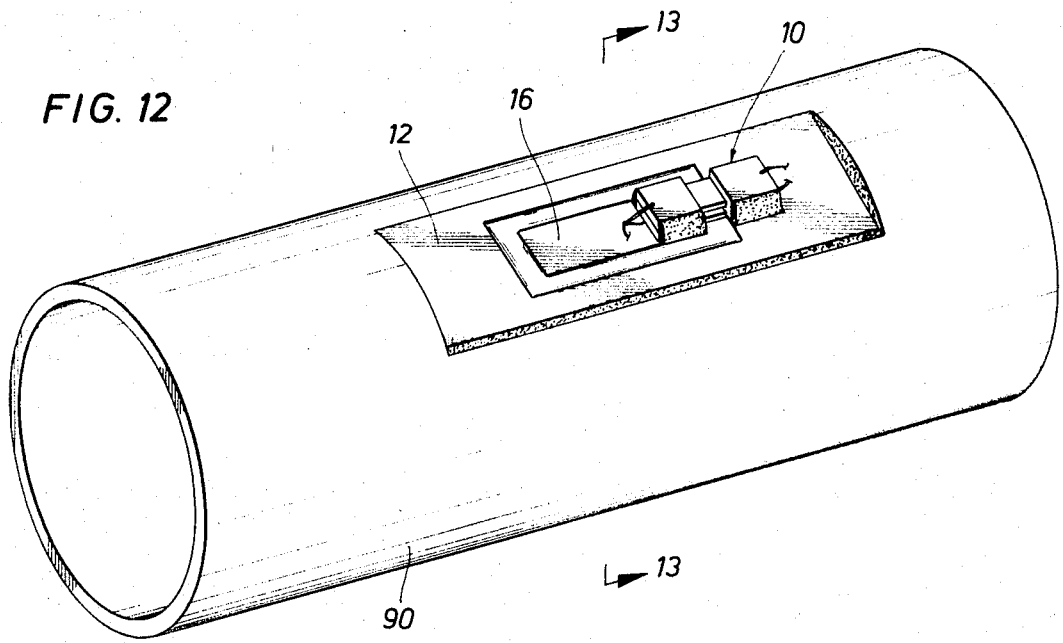
FIG. 12 is perspective view of a conduit-type embodiment of a blood pressure transducer employing the present invention.

One end of the transducer is attached to the plate member 12, and the other end is secured to this piston 16. Movement of the piston 16 is transmitted to the transducer 10 to cause resistance changes which may be detected in a suitable measuring circuit.

The transducer 10 is illustrated as a generally rectangular block of material comprised of two strain-sensitive elements which are connected in a push-pull configuration. Each element is comprised of the same piezoresistive material which may be of the semiconductive type such as silicon. Each element includes a pair of pads 20a and 20b which are interconnected by reduced neck portions 22. The reduced neck portions 22a and 22b have a cross section perpendicular to the longitudinal axis of the transducer, which is small in comparison to the cross section of the pads 20a and 20b. The reduced neck portions 22a and 22b may take a number of shapes such as an hour glass shape. The basic principle of use of the reduced neck portion is to concentrate applied force strain in a narrow portion that has high resistivity per unit length. The pads 20a and 20b of each element are bonded together at a common plane so that the neck portions of each of the separate elements lie parallel to but spaced from each other.

When the transducer is subjected to force perpendicular to its longitudinal axis, one of the reduced neck portions is placed in compression while the other reduced neck portion is placed in tension. The two individual elements are preferably made of the same material, such as silicon, and are of the same dimension and shape so as to be matched. The two elements compensate each other for variations in temperature.

When placed under strain, one reduced neck portion of the dual elements increases in resistance while the other reduced neck portion decreases in resistance. The two individual strain-sensitive elements can be connected in a bridge configuration such that the resistance changes of each element are additive and provide an increased output signal.

Referring again specifically to FIGS. 1–3, the transducer 10 has the face of pad 20b bound to the central piston 16 formed as part of the diaphragm. The face 24 of the other pad 20b of one element is bonded to the plate member 12. The edge of each of the strain gauge elements is coated with a conductive material. Specifically, the upper surfaces of pads 20a are coated with a conductive material and so are the lower surfaces of pads 20b.

Each of the strain-sensitive elements is bonded together by means of an epoxy material 26 applied to the side of each end pad 20a and 20b. Other means may, of course, be utilized for joining the respective end pads of the two strain-sensitive elements. The interface between the pads 20 of each strain gauge element is maintained as an electrically insulated layer. An extremely thin layer of epoxy is deposited at this interface to insulate the elements from each other.

Three conductors are shown attached to the strain gauge element 10. A first conductor 30 is connected, as by soldering, to the conductive face of the upper surface of one pad. A second conductor 31 is connected to the lower surface of an end pad on surface 24. A third conductor 32 is connected to a common juncture 33 with wires 34 and 35 leading to the upper and lower faces respectively of end pads 20.

As described above, the strain gauge element according to the invention includes two separate elements which are joined together by bonding. In other embodiments of the invention, the dual elements may be formed by presently known integrated circuit techniques or other techniques yet to be developed for forming a unitary structure with separately insulated elements.

The use of the strain-sensitive transducer having two sub-elements in accordance with the present invention provides a number of advantages:

1. The dual element, according to the invention, is self supporting whereby lateral forces are entirely converted into compression or tension of the reduced neck portion of each strain element.
2. The transducer according to the invention has a linear response to D.C. and is stable with negligible drift and hysteresis.
3. The transducer is self compensated for internally generated thermal gradients.
4. With matched strain elements, the dual element device according to the invention is self temperature compensating.
5. No separate beam element is required according to the present invention. The decreased mass of the element results in a resonant frequency which is much higher than that of the conventional strain-sensitive element secured to a beam. Thus, resonant frequencies according to the present invention may be in the vicinity of 20 to 40 kiloHertz.

The conventional strain element secured to a supporting beam has a large mass associated with the beam. In conventional elements made with the conventional strain sensor, the strain element can be readily broken if the device is dropped or subjected to gravitational or acceleration forces. With the dual element according to the present invention, the mass is much lower and the strain element is much less susceptible to breakage or to measurement error due to gravitational or acceleration forces.

A particular embodiment of the invention is illustrated by the catheter tip blood pressure transducer shown in FIGS. 4–7. The catheter tip transducer illustrated in FIGS. 4–7 is, of course, enlarged many times its actual size for use as an intraarterial or intravenous blood pressure transducer. The transducer comprises a catheter tip formed of a tubular element 40 having a flattened side 41. An active transducer element in the form of one of the modular elements illustrated in FIGS. 1–3 is mounted in the flattened side 41. The flattened side 41 is formed by removing a section of the wall of the tubular element 40. The section is shown removed from a portion including the tip of the tubular element 40, but it will, of course, be understood that in other embodiments a section can be removed from a midway portion of the catheter tip.

It will be noted from FIG. 3 that the plate member 12 includes beveled side portions 42 which rest on the side walls of the tubular element 40 below the section of wall removed. The plate member 12 may be attached to the wall of the tubular element 40 by means of adhesive such as epoxy. A sealed compartment 50 is formed inside the catheter tip by closing the end with sealing material 52 and closing the portion 54 between the upper surface of the plate member and the unremoved wall section of the tubular element 40. At the shank end 56, of the catheter tip is mounted a flexible hose 58 which is secured by any convenient means such as a ring of epoxy 60. Flexible hose 58 provides an air or fluid passageway from the sealed compartment 50 to a source of reference pressure such as atmospheric. The hose 58 may be made the necessary length for intraarterial measurements. The electrical conductors 30, 31 and 32 from the strain gauge sensor 10 are carried inside of the hose 58 to a suitable electrical connector, not shown.

The resistance of a strain gauge 10 may be measured in any suitable measuring or monitoring circuit, one such circuit being illustrated in FIG. 8 as a conventional Wheatstone bridge. Resistances 72 and 73 schematically represent respectively the resistances of each of the elements in the strain gauge 10. Resistances 74 and 75 are adjusted to compensate the temperature imbalances; and resistances 70 and 71 are adjusted to balance the bridge. A source of electrical excitation such as a DC potential source 76 is provided across the Wheatstone bridge. A measuring device such as a meter 78 is provided across one arm of the Wheatstone bridge. A measuring device such as a meter 78 is provided across the other arm of the Wheatstone bridge. When the strain gauge element is under no load conditions, the Wheatstone bridge is in balance and no electrical current passes through meter 78. However, when a load is applied to the strain gauge 10 by the application of fluid pressure, a change in the resistance of strain gauge 10 is caused, which in turn causes a change in the resistance 72 and 73 and results in a flow of electric current through meter 78. The flow of current through meter 78 is directly proportional to the amount of fluid pressure to cause flexure of the strain gauge element.

The Wheatstone bridge circuit described above is of the direct current type, but, of course, it is possible and often suitable to use alternating current electrical excitation. Also a visual waveform readout may be provided by substituting an oscilloscope across the arms of the Wheatstone bridge in place of, or in addition to, the meter 78. Also, a strip chart may be provided by connecting measuring arm of the Wheatstone bridge to the input of a strip chart recorded and running the strip chart recorder and running the strip chart as a function of time.

The catheter tip transducer described in connection with FIGS. 4–7 lends itself to many applications besides intraarterial and intravenous measurements of blood pressure. It may, for example, be inserted inside of a separate pressure dome as illustrated in FIG. 11. A catheter tip transducer 80 is shown inside of a pressure dome 82 defining a pressure chamber 84. The pressure chamber 84 communicates with a source of fluid pressure carried by the tubing 86. The pressure dome 82 includes exterior threads on to which fit a cap 88. A sealing ring 90 is mounted inside the cap 88 adjacent to the end of pressure dome 82. By tightening the cap 88 on the threads, the sealing ring 90 is made to compress on the sides of the catheter tip transducer 80 and create a pressure seal inside the pressure chamber 84. The tube 86 may be connected to a source of fluid pressure to be measured, such as blood pressure, and the fluid pressure will actuate the strain gauge sensor inside the catheter transducer 80.

Thus, the catheter tip transducer embodying the present invention can have wide application not only for at-the-source measurement, but also for measuring fluid pressure remotely from the source of generation by use of a fluid column to transmit pressure pulsations to a pressure chamber.

Figure 13:
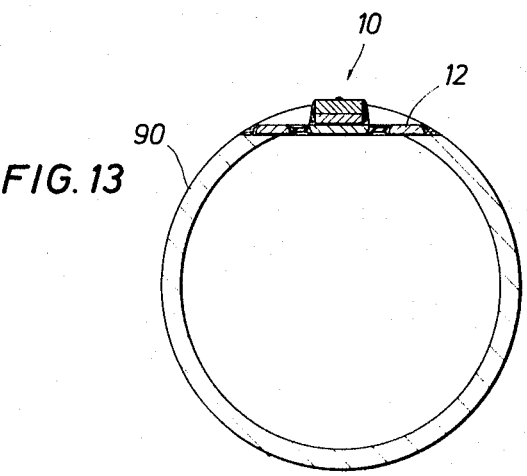
FIG. 13 is a sectional view taken along line 13—13 in FIG. 12.

Illustrated in FIGS. 12 and 13, is another embodiment of the invention in the form of a conduit-type of pressure transducer for measuring the pressure of fluid flowing through a tube of conduit 90. Milled in the wall structure of the tube 90 is a slot into which is mounted the plate 12 containing the modular element illustrated in FIGS. 1–3. The plate 12 may be fixed in the slot by means of epoxy material or other adhesive. In response to variations in fluid pressure inside the bore of tube 90, the diaphragm carried on the plate member 12 flexes and transmits motion from the piston 16 to create resistance changes in the strain element 10.

In FIGS. 9 and 10 are illustrated a differential pressure transducer embodying the principles of this invention. A pressure housing 100 is divided into two halves, 100a and 100b, which are joined by bolts 102 connected through a circumferential flange 104. The pressure housing 100 is divided into compartments separated by a bulkhead created by a disc 110. Located in a slot in the disc 110 is a modular element similar to that shown in FIGS. 1–3. The modular element includes a piston member 16 and a strain gauge 10. Flexure of the diaphragm carried by the plate member 12 results in deformation of the strain gauge 10 which may be measured in terms of changes in its resistance. A first fluid pressure $P_1$ is applied to the upper chamber through a bore 116 and a second pressure $P_2$ is provided to the lower chamber through bore 118. The result in differential pressure between the two applied pressures $P_1$ and $P_2$ will cause the piston 116 to move toward one pressure compartment or the other. The resultant change in electrical characteristics of the strain gauge 10 will serve as a direct measure of the difference in pressure.

What is claimed is:

1. A blood pressure transducer comprising:
a housing having an opening;
a flexible diaphragm mounted in said opening, said housing being adapted for source of fluid pressure to be exposed to said diaphragm;
a pair of strain-sensitive elements comprised of the same piezoresistive material, each of said elements having two spaced pads, the pads of each element being interconnected by a reduced neck portion, said neck portions being spaced from and parallel to a plane of symmetry and being of substantially the same dimension and shape, said pads of each element being joined together at contiguous faces;
a layer of electrically insulating material between the contiguous faces of each pad;
means for affixing one of said pads in one element to a portion of said diaphragm and for affixing the other pad in said element to said housing, whereby flexure of said diaphragm causes compression in the reduced neck portion of one element and tension in the reduced portion of the other; and
electrodes electrically connected to the pads of each of said elements on opposite sides of said reduced neck portions.

2. A blood pressure transducer comprising:
a generally cylindrical catheter tip having a tip end and a shank end, said catheter tip having one flattened side, the interior of said catheter tip forming a sealed compartment;
a diaphragm being mounted in the flattened side of said catheter tip, said diaphragm being exposed on one side of said sealed compartment;
a pair of strain-sensitive elements of the same piezoresistive material joined together at a common plane, each of said elements having two spaced pads, the pads of each element being interconnected by a reduced neck portion, said neck portions being spaced from and parallel to a plane of symmetry and being of substantially the same dimension and shape, said pads of each element being joined together at contiguous faces along said plane of symmetry;
a layer of electrically insulating material between the contiguous faces of each pad;
means for securing one of said pads in one element to a portion of said diaphragm and for securing the other pad in said one element to said catheter tip, whereby flexure of said diaphragm causes a compression in the reduced neck portion of one element and a tension in the reduced neck portion of the other element;
electrodes electrically connected to the pads of each of said elements on opposite sides of said reduced neck portions;
a flexible cable secured to the shank end of said catheter tip, the flexible cable providing a fluid passage from a source of reference pressure to the sealed compartment within said catheter tip; and
electrical conductors within said flexible cable, said conductors being electrically insulated from each other and being connected to respective ones of said electrodes.

3. A blood pressure transducer comprising:
a conduit adapted to carry the fluid whose pressure is to be measured, said conduit having an opening in the wall structure thereof;
a flexible diaphragm mounted in said opening in the wall structure of said conduit, said diaphragm being adapted to flex in response to pressure variations in the fluid to be carried in said conduit;
a pair of strain-sensitive elements of the same piezoresistive material, each of said elements having two spaced pads, the pads of each element being interconnected by a reduced neck portion, said neck portions being spaced from and parallel to a plane of symmetry and being of substantially the same dimension and shape, said pads of each element being joined together at contiguous faces;
a layer of electrically insulating material between contiguous faces of each pad;
means for securing one of said pads in one element to a portion of said diaphragm and for securing the other pad in said one element to said conduit, whereby flexure of said diaphragm causes a compression in the reduced neck portion of one element and a tension in the reduced neck portion of the other element;
electrodes electrically connected to the pads of each of said elements on opposite sides of said reduced neck portions.

4. A blood pressure transducer comprising:
a pressure housing having two compartments separated by a bulkhead, the pressure housing having fittings for respectively connecting a first and second source of fluid pressure to be measured to said compartments, the bulkhead having a passageway extending from one compartment to the other;
a diaphragm formed in said passageway;
a pair of strain-sensitive elements of the same piezoresistive material, each of said elements having two spaced pads, the pads of each element being interconnected by a reduced neck portion, said neck portions being spaced from and parallel to a plane of symmetry and being of substantially the same dimension and shape, said pads of each element being joined together at contiguous faces;
a layer of electrically insulating material between contiguous faces of each pad;
means for securing one of said pads in one element to a portion of said diaphragm and for securing the other pad in said one element to said bulkhead, whereby flexure of said diaphragm in response to the differential pressure between said first and second fluid sources causes compression in the reduced neck portion of one element and tension in the reduced neck portion of the other element; and
electrodes in electrical connection to the pads of each element on opposite sides of said reduced neck portion.

* * * * *

PO-1050
(5/69)

UNITED STATES PATENT OFFICE
CERTIFICATE OF CORRECTION

Patent No. 3,748,623          Dated July 24, 1973

Inventor(s) Huntly D. Millar

It is certified that error appears in the above-identified patent and that said Letters Patent are hereby corrected as shown below:

Claim 1, line 1, the word "blood" should be deleted;

line 4, insert --a-- before the word "source;"

Claim 2, line 1, change "blood" to --physiological--;

Claim 3, line 1, the word "blood" should be deleted;

Claim 4, line 1, the word "blood" should be deleted.

Signed and sealed this 20th day of November 1973.

(SEAL)
Attest:

EDWARD M. FLETCHER, JR.          RENE D. TEGTMEYER
Attesting Officer          Acting Commissioner of Patents